United States Patent [19]
Williams

[11] Patent Number: 5,592,960
[45] Date of Patent: Jan. 14, 1997

[54] HUNTING BLIND

[76] Inventor: Christopher R. Williams, 5525 Mosca Pass Ct., Colorado Springs, Colo. 80917

[21] Appl. No.: 551,312

[22] Filed: Nov. 1, 1995

[51] Int. Cl.$^6$ .......................... E04B 1/348; A01M 31/00
[52] U.S. Cl. .............................. 135/87; 135/91; 135/117; 135/901; 135/900; 92/309.8; 43/1
[58] Field of Search ................................ 135/87, 96, 97, 135/91, 117, 901, 902, 900; 43/1, 2, 3; 52/309.9, 309.8

[56] References Cited

U.S. PATENT DOCUMENTS

| | | | |
|---|---|---|---|
| 3,690,334 | 9/1972 | Miller | 135/901 X |
| 3,709,237 | 1/1973 | Smith . | |
| 3,854,746 | 12/1974 | Flynn et al. | 135/901 X |
| 4,186,507 | 2/1980 | Stinnett | 43/1 |
| 4,224,754 | 9/1980 | Derryberry . | |
| 4,483,090 | 11/1984 | Carper . | |
| 4,506,467 | 3/1985 | Strung | 43/1 |
| 4,581,837 | 4/1986 | Powlus | 43/1 |
| 4,632,138 | 12/1986 | Irwin | 135/901 X |
| 4,723,371 | 2/1988 | Williams . | |
| 4,726,973 | 2/1988 | Thompson | 52/309.8 X |
| 4,794,717 | 1/1989 | Horsmann | 135/901 X |
| 4,917,127 | 4/1990 | Marble et al. | 135/901 X |
| 5,033,493 | 7/1991 | Senchuck | 135/901 X |
| 5,172,525 | 12/1992 | Cook | 135/901 X |
| 5,373,863 | 12/1994 | Prizio . | |
| 5,377,711 | 1/1995 | Mueller . | |

OTHER PUBLICATIONS

Popular Science, vol. 175, No. 4 (Oct., 1956), p. 197—"Portable Duck Blind" article.
Popular Mechanics, vol. 106, No. 5 (Nov., 1956), p. 119—"Portable Duck Blind" disclosure.

*Primary Examiner*—Wynn E. Wood
*Attorney, Agent, or Firm*—Richard C. Litman

[57] ABSTRACT

A hunting blind is constructed of a set of reflectively mirrored wall panels with a camouflaged top cover, to form a rectangular structure which reflects the surrounding environment to conceal the structure of the blind. The wall panels are each preferably formed of a rigid sheet of reinforced closed cell foam material, with a sheet of mirrored clear plastic material bonded to one surface of the foam sheet. The mirrored surface of the plastic sheet is preferably secured directly to the foam sheet, thereby sandwiching the mirrored surface between the overlying clear plastic material and the foam panel to protect the mirrored surface from damage. The wall panels are rigidly but removably connected together with corner channel members to form a rigid, inflexible structure. A top closure or roof may be formed of a flexible camouflage sheet, or alternatively of rigid foam sheet having a camouflage pattern thereon. Other features, including internal anchor flaps, viewing ports and openable top hatches, a lower door for a hunting dog, and storage and shelf areas, may be provided as desired. The entire structure is easily transportable by disassembling the panels at the corner channel connecting members and removing the top cover, passing some hanging straps through the open view ports, and passing a pole through the straps to carry the disassembled structure using the central pole.

16 Claims, 6 Drawing Sheets

HUNTING BLIND

FIELD OF THE INVENTION

The present invention relates generally to equipment used in animal game hunting and fishing, and more specifically to a blind adapted to conceal a hunter or hunters therein from observation by game. The blind comprises a plurality of rigid, externally mirrored walls which may be assembled and disassembled to form a portable, rigid structure and which walls serve to reflect the surrounding environment accurately in order to cause the blind to appear to blend with the environment. Various embodiments of camouflaged roofs or covers are also provided, as well as other features.

BACKGROUND OF THE INVENTION

Historically, it has been recognized by hunters that some form of concealment is advantageous when hunting game, whether it be larger mammals or relatively smaller birds and the like. While mammalian sight is often not exceptionally keen, particularly in the case of grazing animals such as deer, birds nearly universally have excellent eyesight due to their often airborne environment. Accordingly, while such relatively crude concealment as tree stands and scent means of various sorts may be effective in hunting deer and the like, far more sophisticated blinds are required when bird hunting, particularly in the case of waterfowl such as ducks and geese where typically little concealing cover is available to hunters in the typically marshy wetlands favored by such birds.

As a result, various blinds have been developed, but most all of these rely upon some form of exterior camouflage which mimics the surrounding environment. The problem with such camouflage is that it seldom matches the surrounding environment to a satisfactory degree, and must be changed each time the blind is moved to a new hunting site and/or as the environment changes over time with the seasons or other conditions. While natural materials can provide good camouflage, it can be difficult to provide a truly natural looking pattern of such materials on the exterior of a blind, and live plant materials dry and deteriorate rapidly and require frequent renewal. A synthetic random camouflage pattern obviates the above problems to some degree, but is generally not as effective as natural camouflage, particularly with game birds.

Accordingly, a need arises for a game hunting blind which may be used to conceal a hunter or hunters in the hunting of various species of game animals, but which is particularly suitable for the hunting of birds and more particularly waterfowl such as ducks and geese. The blind comprises a plurality of highly reflective externally mirrored walls, which serve to reflect a view of the immediate environment back to an observing animal and thus cause the blind to blend with the surrounding environment. The blind must be portable and provide for ease of assembly and disassembly, yet form a rigid, solid structure when assembled in the field. Anchor means which preclude any damage to the environment may also be provided, as well as various roof or cover embodiments which serve to conceal hunters and their equipment within the blind. Other features, such as view ports, openable upper hatches for observation and/or shooting, access panels for a hunting dog, various storage means, etc., may also be included optionally.

DESCRIPTION OF THE PRIOR ART

U.S. Pat. No. 3,709,237 issued to Donald K. Smith on Jan. 9, 1973 describes a Sportsman's Blind comprising a plurality of upper and lower panels which are permanently hinged to one another. The panels may be folded along their mutual hinge lines for storage and transport. Smith states that his panels are rigid, but this is not truly the case, as he uses a wire frame with a flexible fabric or other sheet material stitched thereover. The wall panels of the present blind are truly rigid, as will be described further below. No reflectivity, roof or cover structure, anchor means, or separation of panels is disclosed by Smith, which features, as well as numerous others undisclosed in the Smith patent, form the present invention and its various embodiments.

U.S. Pat. No. 4,224,754 issued to S. Wayne Derryberry on Sep. 30, 1980 describes a Portable Hunting Blind of generally cylindrical configuration, with a collapsible coil spring providing the structural shape of the device. The spring is covered with a non-reflective, flexible fabric sheet or the like. The configuration is essentially a large scale variation of non-collapsible duct or hose, as used in clothes dryer vents and automotive and aviation applications.

U.S. Pat. No. 4,483,090 issued to Jackie D. Carper on Nov. 20, 1984 describes a General Purpose Breakaway Two Man Hunting Blind, having a generally prism shaped configuration. The central frame members are under continuous tension toward a collapsed state, and are pulled downward when a release is triggered. Accordingly, the wall members must be formed of a flexible material, unlike the rigid walls of the present blind. No reflectivity is disclosed by Carper for his blind.

U.S. Pat. No. 4,723,371 issued to Douglas C. Williams on Feb. 9, 1988 describes a Self Supported, Collapsible, and Portable Walled Structure Suitable For Use As A Hunting Blind. The structure is similar to that of many flexible frame type tents, but has an open top, unlike the present blind. The flexible fabric or other sheet material walls have no reflectivity, unlike the rigid, mirror reflective walls of the present blind. While one embodiment discloses a net to cover the top, this is unlike the visually impervious flexible camouflage material or rigid sheet used for the top cover of the present blind.

U.S. Pat. No. 5,373,863 issued to Ricci Prizio on Dec. 20, 1994 describes an Invisi-Blind Camouflage Device, wherein a pair of partially translucent reflective sheets are bonded to both surfaces of a clear rigid plastic sheet. This enables a person within the blind to see through the partially translucent panels, assuming that there is relatively more light outside the blind than within. However, Prizio fails to disclose any top cover for his blind, which would allow ambient light into the blind and reduce the effective transparency of the two way mirrored panels. Prizio also provides for windows in portions of the panels, apparently to overcome this difficulty, but such windows would also further reduce the reflectivity of the panels. As the hunting of waterfowl is often done in early dawn when ambient lighting is low, it appears that the Prizio blind construction could cause some difficulty for hunters therein, in attempting to observe game outside the blind. Moreover, any attempt to use a light within the blind (flashlight, etc.) in darkness or low light conditions, would result in that light being visible through the partially transparent reflective panels of the Prizio blind, and alerting any game close by. The Prizio panels are also permanently secured together by hinge means, which results in a need to anchor the panels to the underlying surface in the stormy conditions which are often encountered in the autumn waterfowl hunting season. Many jurisdictions prohibit any digging or marring of the ground, which would preclude anchoring the Prizio blind. The present blind provides a solution to this problem. Also, the panels of the present blind are separable from one another for ease of carriage and transport, and are rigidly connected to one another when assembled in order to provide a more solid structure than the Prizio blind. The Prizio reflective means is applied to the exterior surface of the transparent panels, where it may be scratched or otherwise damaged, whereas the reflective sheet is applied to the protected interior of the sandwich construction of the present reflective panels, where it is protected from damage. These, and other points and features discussed further below, result in a reflective hunting blind which is structurally considerably different, and which includes numerous advantages, over the Prizio blind.

U.S. Pat. No. 5,377,711 issued to Mark Mueller on Jan. 3, 1995 describes a Camouflage Blind For Hunters having a rectangular frame and optically impervious top, back, and sides. The front, however, is formed of camouflage netting which allows a person within the blind to observe animals outside the blind, and to shoot archery arrows or firearms through the small holes in the netting. No reflectivity of any components is disclosed, and the panels of the device are flexible fabric or other sheets, unlike the rigid panels of the present blind.

The October, 1956 issue of *Popular Science* Magazine (vol. 175, no. 4), p. 197, describes the construction of a Portable Duck Blind, first constructed by Arthur Dierker. The device is open and constructed of plywood sheet with natural materials being secured to the outer surfaces for camouflage. No reflectivity or disassembly is disclosed for the Dierker blind.

Finally, the November, 1956 issue of *Popular Mechanics* Magazine (vol. 106, no. 5), p. 119, describes a Portable Duck Blind formed of 10,000 pieces of raffia. The general configuration appears to be similar to the Popular Science blind disclosure discussed immediately above, with a partially open top and front. No disassembly or reflectivity is disclosed in the article, and the blind is adapted to be supported by a folding boat. While the present blind might be used with a boat, it is considerably more versatile and may be used in many different environments as well.

None of the above noted patents, taken either singly or in combination, are seen to disclose the specific arrangement of concepts disclosed by the present invention.

SUMMARY OF THE INVENTION

By the present invention, an improved hunting blind is disclosed.

Accordingly, one of the objects of the present invention is to provide an improved hunting blind which comprises a generally rectangular structure formed of a plurality of rigid, opaque, externally reflectively mirrored wall panels, providing for the optically correct reflection of the immediate environment to provide concealment of the blind structure.

Another of the objects of the present invention is to provide an improved hunting blind which includes a roof structure or top cover means, which may comprise a flexible sheet of camouflage material or a rigid sheet of camouflaged foam material, with the rigid top including at least one selectively openable and closable hatch therein.

Yet another of the objects of the present invention is to provide an improved hunting blind which wall panels are formed of reinforced panels of closed cell foam material bonded to panels of mirrored transparent plastic sheet material, with the mirrored surface of the plastic sheet being applied to the foam sheet to protect the mirrored surface from abrasion or other damage.

Still another of the objects of the present invention is to provide an improved hunting blind which panels are separably affixed to one another by means of corner channel components immovably connecting adjacent panels to prevent the relative movement thereof, and which at least one corner channel may comprise two components to allow the adjacent panels to be spread for entrance and exit to and from the interior of the blind.

A further object of the present invention is to provide an improved hunting blind which may include additional features, such as openable and closable mirrored view ports, at least one mirrored door adapted for the entrance and exit of a hunting dog therethrough, foldable shelf means, storage means, and a removable gun rack therein, as well as other features.

An additional object of the present invention is to provide an improved hunting blind which may include at least one anti-glare cover sheet adapted to be placed over a sunward facing side or sides and to reduce reflected glare therefrom.

Another object of the present invention is to provide an improved hunting blind which may include anchor means adapted to secure the blind from motion due to wind, which anchor means preclude any requirement for digging or other penetration of the underlying surface.

Yet another object of the present invention is to provide an improved hunting blind which may include means for carriage of the disassembled components.

A final object of the present invention is to provide an improved hunting blind for the purposes described which is inexpensive, dependable and fully effective in accomplishing its intended purpose, and which is further adaptable for use in wildlife photography, observation, and other purposes.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
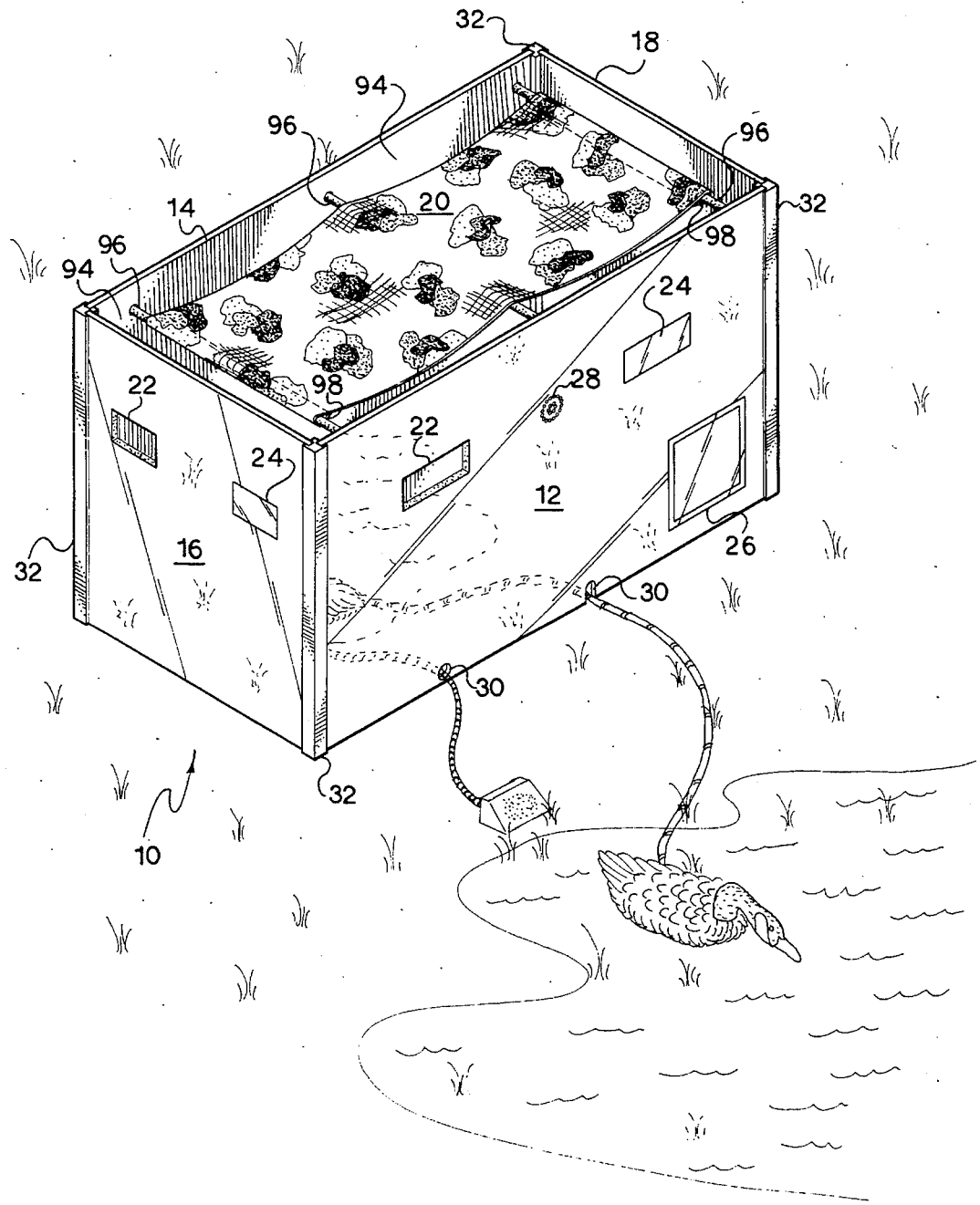
FIG. 1 is a top and front perspective view of the present hunting blind, showing its reflective surfaces and other features.

Referring now particularly to FIG. 1 of the drawings, the present invention will be seen to relate to a portable, collapsible hunting blind 10 formed of a plurality of rigid, reflectively mirrored panels, i.e., front, rear, and opposite first and second side panels 12, 14, 16, and 18, and including a camouflaged top or cover 20. At least one of the panels 12 through 18 may include at least one view port 22 therethrough and located in the upper portion(s) thereof, which port(s) 22 may be selectively closed as desired by means of a view port cover(s) 24 having essentially the same construction and reflectively mirrored outwardly facing surface as that of the panels 12 through 18. At least one of the panels may also include an access door 26 in the bottom portion thereof, providing for the entrance and exit of a hunting dog to and from the blind 10. Additional features, such as a perforated speaker outlet 28 for transmitting bird calls or other sounds, and/or one or more access passages 30 providing for the passage of a speaker cable(s) and/or decoy actuating cable(s), may also be provided as desired. The panels are temporarily secured together by means of a plurality of panel edge connectors 32, connecting a first edge and an adjacent second edge of adjacent panels.

Figure 2:
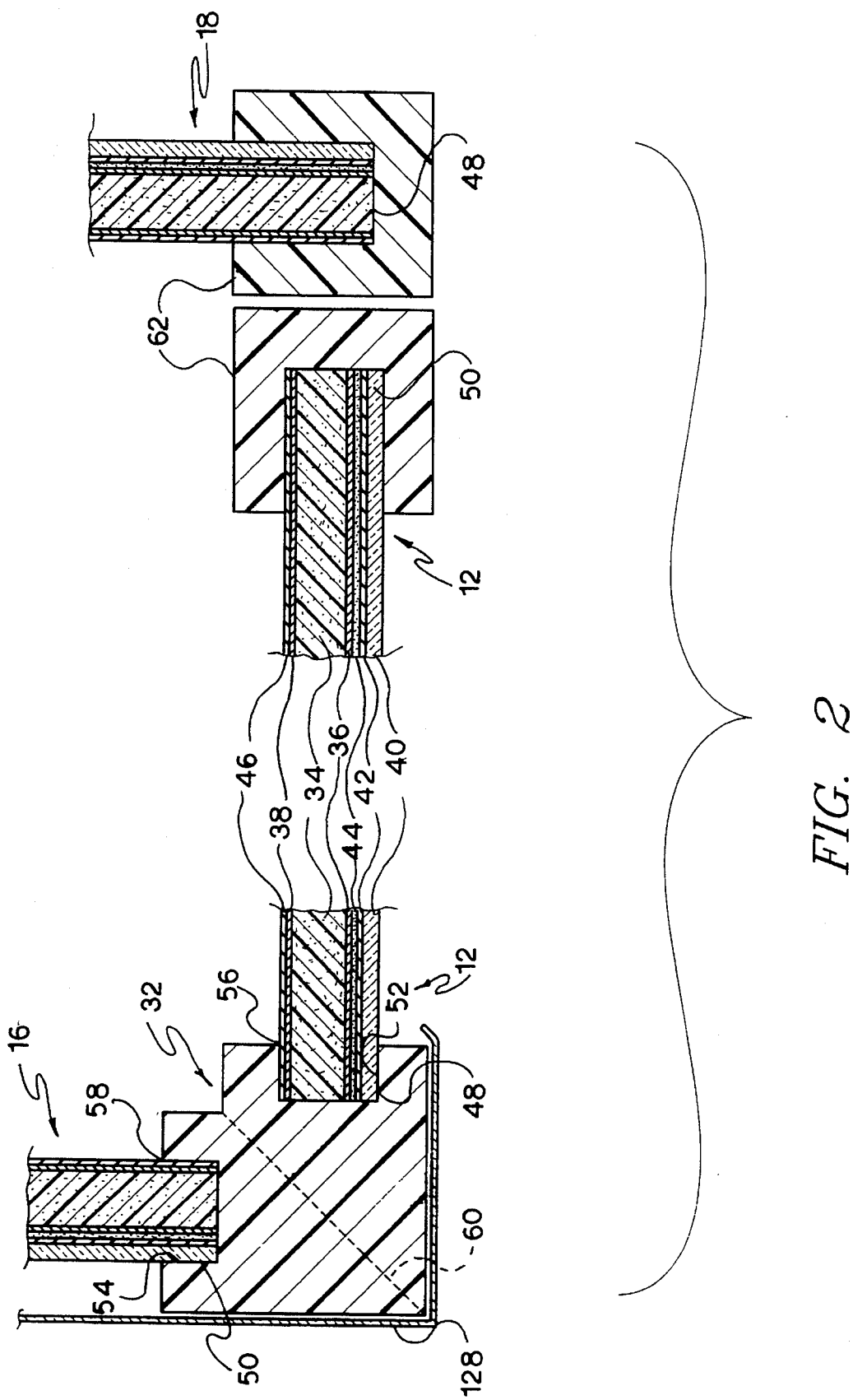
FIG. 2 is a top plan view in section, showing details of the wall panel structure of the present hunting blind.

FIG. 2 provides a detailed plan view in section of the specific construction of the panels, e. g., panels 12, 14, and 16, and the panel edge connectors 32 used to secure the panels together. (While the specific construction of a front panel 12 is described in detail, it should be noted that all panels 12 through 18 have the same construction.) The basic foundation of each of the panels is formed of a fairly rigid, lightweight sheet of closed cell foam plastic material 34, with a first or outwardly disposed (i. e., toward the exterior of the blind 10) reinforcement layer 36 and an identical second or inwardly disposed reinforcement layer 38 of smooth, plasticized fibrous material, such as a coated paper product. This three layer board or sheet material is sometimes used as a posterboard material, and is manufactured under the trademark, "Gatorfoam" by one company. Other equivalent materials may be used.

This sheet of material comprising layers 34 through 38 is in turn covered by a transparent plastic sheet 40 of acrylic or other suitable material, which sheet 40 is coated on its inwardly facing surface with an outwardly reflecting (i. e., through the sheet 40) mirrored surface 42. This mirrored transparent plastic material comprising layers 40 and 42, is manufactured under the name "Pleximirror" (tm). Again, suitable equivalents may be substituted. The silvered or mirrored plastic 40/42 is in turn adhesively secured to the first or outwardly facing layer 36 of the foam laminate sheet 34, by means of an adhesive coating 44 therebetween, to provide a substantially flat, reasonably rigid and optically correct, reflectively mirrored panel 12. The inwardly facing reinforcement layer 38 may be provided with an ultraviolet protective paint or other coating 46, as desired.

Figure 5:
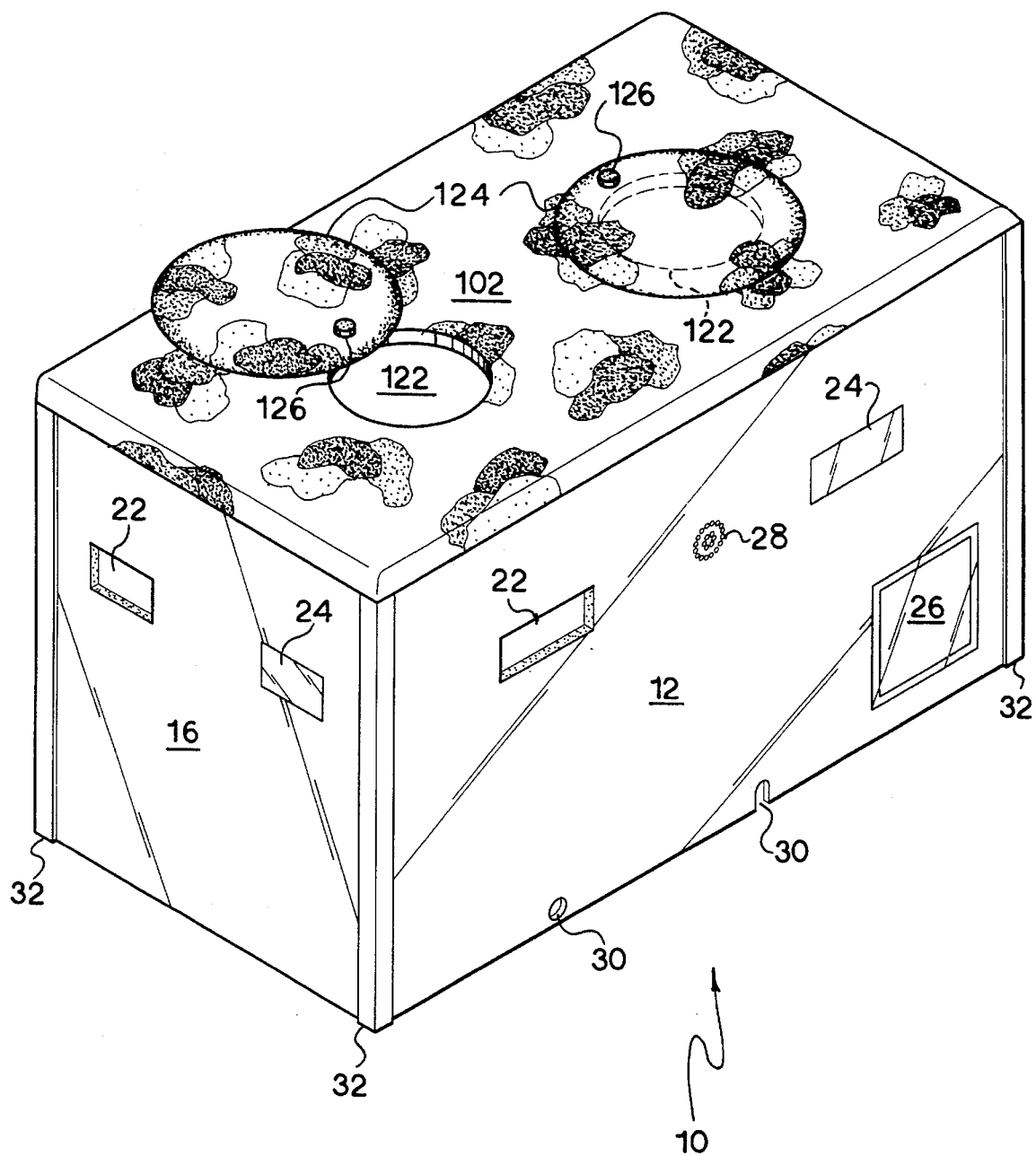
FIG. 5 is a top perspective of another alternate embodiment roof and hatch configuration for the present hunting blind.

As noted above, each of the panels 12 through 18 comprising the present reflective hunting blind 10 are constructed in the same manner as the exemplary panel 12 described in detail immediately above. The panels may be provided in any practicable dimensions, such as four foot by eight foot panels as shown in FIGS. 1 and 5 forming a blind capable of concealing more than a single hunter, or alternatively may be cut or otherwise formed in smaller sheets (e.g., four foot by four foot panels, or even slightly narrower) for a single hunter, as desired.

In any case, each of the panels 12 through 18 will have a first lateral edge 48 and an opposite second lateral edge 50. A first lateral edge 48 of one panel and a second lateral edge 50 of another panel are arranged adjacent one another, and inserted into a common edge connector 32, to assemble the present blind 10. Each edge connector 32 (which may also be mirrored) includes a first and a second elongate channel 52/54, with the channels 52/54 being parallel and having openings 56/58 perpendicular to one another, thereby providing for the panels inserted therein to be disposed at right angles to one another. When four such panel edge connectors are used to assemble four panels 12 through 18, the result is a relatively rigid rectangular blind structure 10. Preferably, no adhesives or other permanent assembly means are used, in order that the panel edges 48/50 may be removed from their respective channels 52/54 to provide portability for the present blind 10.

An alternative construction for the panel edge connector 32 is provided by separating the two channels 52/54 along a diagonal bisector 60 (shown in broken lines) or providing two separate edge members 62, in order for one panel to be moved easily relative to another in the field without removing the edge connector therefrom.

Figure 3:
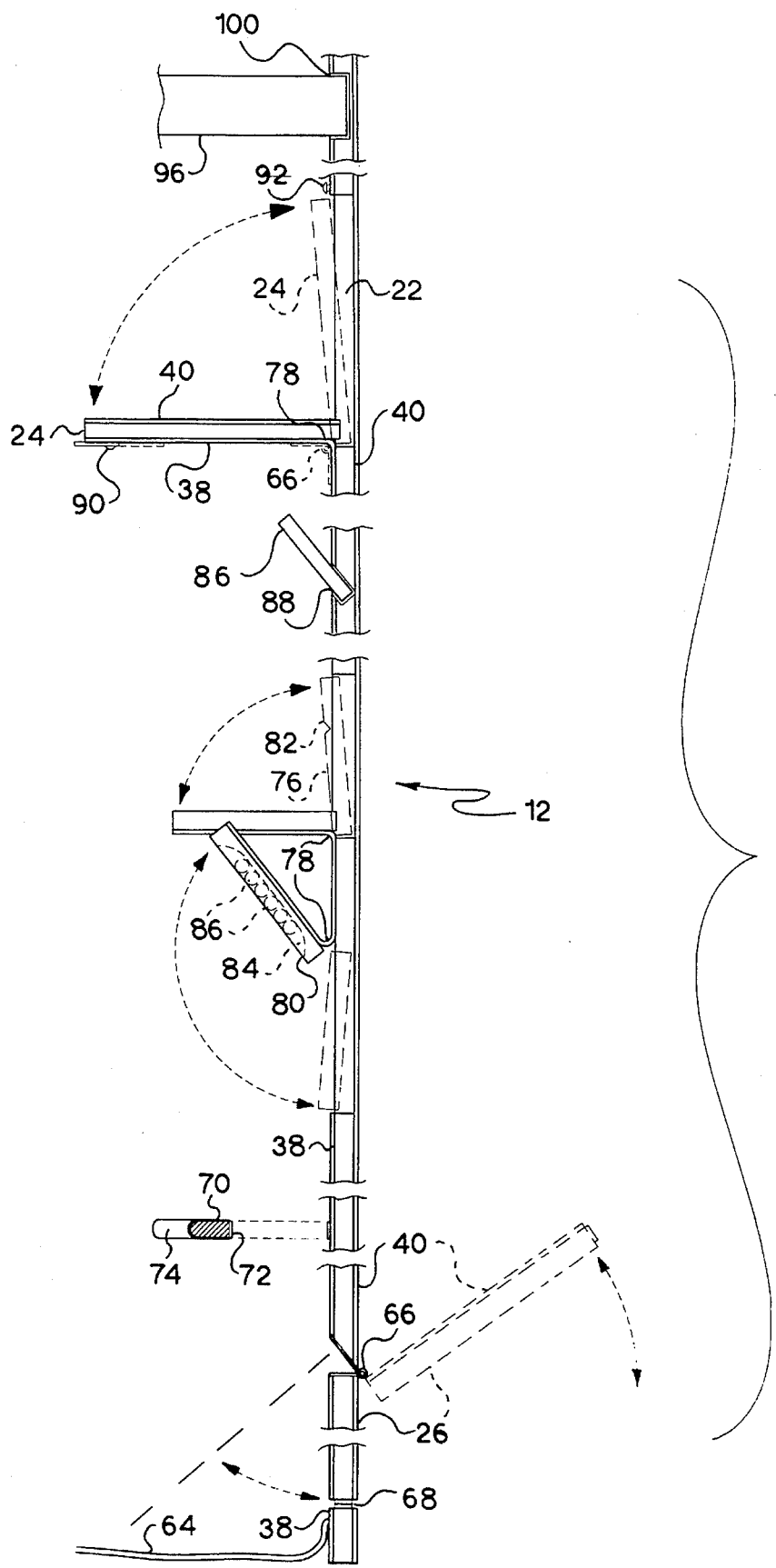
FIG. 3 is a side elevation view in section of a front wall panel of the present hunting blind, showing further details.

FIG. 3 discloses a schematic elevation view in section of an exemplary panel, e. g., panel 12, showing the various features which may be incorporated into the present hunting blind 10. While only a single panel 12 is shown, it is understood that another panel or panels may be formed having some or all of the same features therein. Also, it should be understood that each of the features shown in FIG. 3 would not necessarily be placed in direct vertical alignment with one another, nor necessarily all be used in a single panel, as shown. FIG. 3 is used to demonstrate the various possible features which may be incorporated in the panels of the present blind, and not to indicate that all would be used in a single panel.

As the present construction is relatively light, perhaps weighing on the order of 40 to 50 pounds, depending upon size, roof or top construction, and other features, some anchor means is highly desirable for the blind 10 in stormy conditions. Many prior art blinds provide some form of anchor which digs into the ground, but such anchors are not legal in many areas, where damaging the environment is not permitted. Accordingly, the present blind 10 may include an anchor sheet 64 comprising a thin, flexible sheet of material which is secured (adhesively or mechanically) to the lower portion of the inner surface 38 of the panel 12, and which may be unfolded and extended inwardly within the interior volume of the blind 10. Thus, the weight of a hunter standing directly upon the anchor sheet 64, or seated on a folding chair (not shown) resting upon the sheet 64, provides sufficient weight to capture the anchor sheet against the underlying surface, and secure the panel 12 (and others having anchor sheets 64 extending inwardly therefrom) to preclude any substantial movement of the blind in windy conditions.

Many hunters use a hunting dog or dogs for assistance, depending upon the type of hunting being done, and it is common for waterfowl hunters to use some species of retriever to pick up downed birds while hunting. It is of course important that the dog be concealed, except after a bird is downed and the dog is sent out to fetch the bird(s). Accordingly, the lower portion of the panel 12 (or other panels) may include a two way hinged access door 26 (also shown in FIG. 1), providing for the exit and entrance of a hunting dog to and from the blind 10. The door 26 is constructed in the same manner as the rest of the panel to which it is attached, with a reflectively mirrored outer surface as shown in the panel of FIG. 2 and described in detail above. The door 26 may use a continuous length of hinge 66 ("piano hinge") or other hinge means, and may be secured at its bottom edge by a pair of mutually attractive magnets 68, one of which is installed on the threshold and the other of which is installed on the lower edge of the door 26.

In a relatively compact blind 10, it is important that various articles be stored neatly, yet be readily at hand for rapid deployment as required. Accordingly, a very light and simple gun rack 70 is provided, which is removably securable to the inner surface 38 of the panel by hook and loop fastener means 72 (e. g., Velcro, tm) or other suitable means. The rack 70 is preferably formed of a light but durable resilient material, such as neoprene, in order to "give" when a gun is inserted or withdrawn from the device, and may include one or more slots 74 (one of which is shown in section in FIG. 3) adapted to secure a gun barrel removably therein. The rack 70 may be easily removed from the panel when the blind 10 is disassembled for movement or storage.

Additional utility may be provided by means of a shelf 76 which may be formed from the foam and backing structure of the panel, to fold inwardly when deployed. The backing sheet 38 and underlying foam matrix 34 may be cut through, with the backing sheet 38 left uncut along one edge to form a live hinge 78 for the shelf 76. An underlying support member 80 may be formed in the same manner, to fold upwardly to engage a notch 82 in the bottom of the shelf 76 when it is deployed.

As the foam material 34 is relatively easy to work, it may be removed from the support member 80 (or other area of the panel) to provide a storage pocket 84 for one or more pegs 86, for the purpose of hanging clothing, bird calls, etc. thereon. A hole(s) 88 may be provided in the inner portion of the panel, for the installation of such a peg(s) therein, for use when the blind 10 is assembled. The peg(s) 86 may be withdrawn from their corresponding peg hole(s) 88 and stored in the shelf support storage pocket 84, or other storage area, when the blind 10 is disassembled.

As noted further above in the discussion of the features of the blind 10 shown in FIG. 1, one or more view ports 22 may be provided in one or more of the panels of the blind 10. View port cover(s) 24 may be provided to close the port(s) 22, to provide a more uniform mirrored surface for the blind 10. Such covers 24 may be completely removable from the view ports 22, or may be secured to the panel by hinge means (live hinge, as discussed above, or with an optional hinge 66, as used on the swinging hunting dog door panel 26 discussed further above). Such a hinged view port cover 24 may include a pivotable latch 90, which selectively engages a latch pin 92 disposed immediately above the view port 22, or other securing means as desired.

FIG. 3 also discloses the support means for the camouflage top or cover 20, shown in FIG. 1. The cover 20 comprises a thin, flexible sheet of camouflage pattern material, in order to conceal substantially the interior of the blind 10 from above. (A viewing gap 94, as shown in FIG. 1, may be provided around the periphery of the cover 20, if desired.) The cover 20 may be draped over a pair of oppositely disposed top support members 96, or hemmed to provide an elongate pocket 98 through which the support members are passed. (One or more intermediate support members 96 may be provided for larger blinds 10, if they are found to be needed.) The support members 96 are preferably formed of a somewhat flexible material, such as polyvinyl chloride (PVC) pipe or tube, in order that they may be flexed into place between opposite panels of the blind 10. Top support holes 100 are provided to hold the support members 96.

Figure 4:
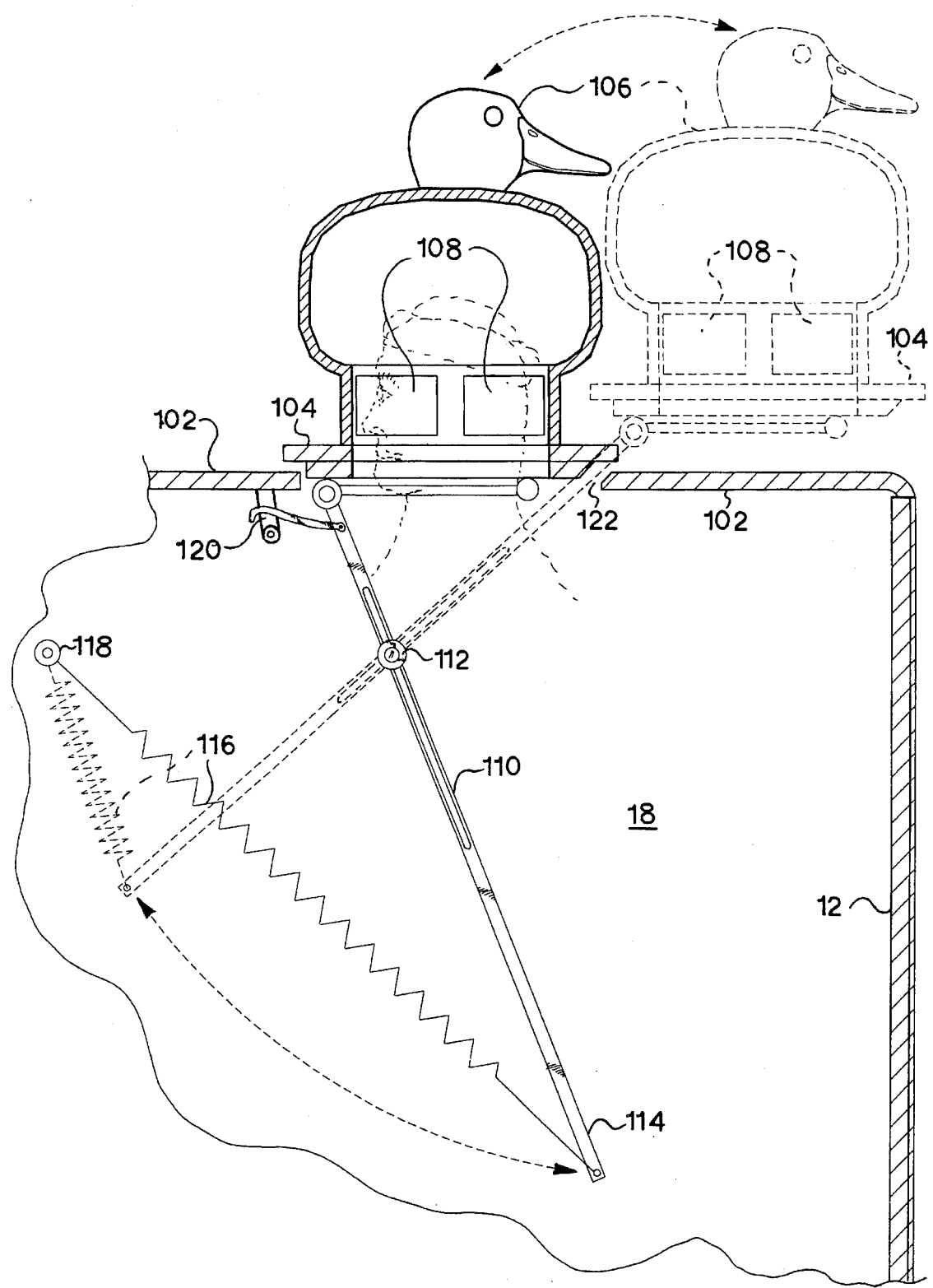
FIG. 4 is a broken away side elevation view in section, showing details of an alternate embodiment roof and hatch.

An alternative roof or top construction is shown in FIGS. 4 and 5. In FIG. 4, a solid roof panel 102 is disclosed, which panel 102 may be formed of a camouflaged sheet of foam material, similar to the "Gatorfoam" (tm) material used for the wall panels 12 through 18 of the present blind 10. The increased rigidity of such a panel 102 enables it to support additional structure, such as at least one openable upper hatch 104. The hatch 104 may optionally include a hollowed decoy 106 thereatop, providing sufficient room for the head of a hunter therein. By raising the decoy 106 slightly above the top of the hatch 104, hatch view ports or observation slots 108 may be provided between the hatch 104 and the base of the decoy 106, preferably disposed completely around the decoy 106 base to provide a hunter, bird watcher, etc. with an unimpeded 360 degree view.

Birds in flight tend to be more startled by objects on the surface which rise toward them, than those which move essentially horizontally. Accordingly, the above described hatch 104 is provided with a quick release mechanism that allows it to move generally laterally relative to the blind 10, rather than being hinged at one edge and pivoting arcuately upwardly for opening. An arm 110 is pivotally affixed to a side panel 18 of the blind 10 at a pivot point 112, with a lower end 114 of the arm 110 having a tension spring 116 connected thereto. The opposite end 118 of the spring 116 is affixed to the panel 18. A quick release latch 120 secures the hatch 104 in a normally closed position. When the hook or latch 120 is released, the spring 116 retracts, drawing the arm lower end 114 upwardly toward the spring attach point 118. The opposite end of the arm 110 swings the hatch 104 essentially laterally from the roof panel opening 122 to open the roof panel 102 quickly. A slot 124 may be provided in the arm 110, to allow the arm to travel somewhat upwardly to enable the hatch 104 to clear the top 102. Other portions of the linkage are not shown for clarity in the drawing, but alternative linkages may be used.

FIG. 5 discloses an alternative hatch construction in combination with the rigid roof or top panel 102 of the blind 10. The wall panel structure will be seen to be essentially identical with that described above, and shown in FIGS. 1 through 4. The rigid foam, camouflaged roof or top panel 102 is also similar to that shown in cross section in FIG. 4 of the drawings. However, a different hatch arrangement is provided in the blind 10 of FIG. 5, wherein the hatch(es) 124 is/are secured to the roof 102 by peripheral pivot(s) 126. The hatch(es) 124 pivot laterally to expose the opening(s) 122.

Other options are available in combination with the above described reflectively mirrored and portable hunting blind 10. For example, mirrored surfaces are well known to produce a reflective glare when exposed to direct sunlight or other bright light. Such glare has an unnatural appearance, and would tend to make the present blind 10 visible in bright sunlight. Accordingly, an anti-glare shield 128 may be provided, as indicated in the cross sectional elevation view of FIG. 2. The anti-glare shield 128 is formed of a thin, transparent sheet of material with a matte finish, to break up any reflected glare and yet provide a clear view therethrough of the image reflected by the underlying panel 12/14/16/18. Such anti-glare materials are commonly used to cover the glass used to protect a picture in a picture frame, and in other applications. The shield 128 may have retaining edges extending from opposite edges thereof, providing for the shield 128 to be resiliently snapped in place over the opposite edge connectors 32 of a sunward panel of the blind 10.

The above described blind 10 in its various embodiments is adaptable to use in various environments. While its use on land, or at least marsh areas, is disclosed herein, the reflectivity of the mirrored panels 12 through 18 will provide excellent camouflage for the blind 10, no matter where it is used. For example, some may wish to install the blind 10 on a boat for use in a lake or other marine environment. This could be easily accomplished by installing lateral poles, such as the top support poles 96 discussed above, across lower portions of the blind 10 to support the blind 10 across the gunwales of the boat. Other support means may also be used. The only modification required for such use, would be a change to the camouflage pattern of the top.

As the present blind 10 is relatively light weight for its size, due to the extensive use of foam plastic material therein, it is relatively easily transportable. Hand carriage is readily feasible with the present blind 10, due to its ability to be broken down into four basic panels 12 through 18. However, other transport means may also be used, such as a sled (not shown) for transport over frozen or soft areas, or wheels (not shown) which may be removably attached to the lower portions of one or more of the panels 12 through 18 to transport the disassembled or assembled blind 10 as desired. Such wheels may be clipped or otherwise temporarily and removably secured to the lower edge(s) of the panel(s) as needed for the transport of the blind 10 to and from a storage area to a vehicle for transport, and/or to and from the vehicle for use in the field.

Figure 6:
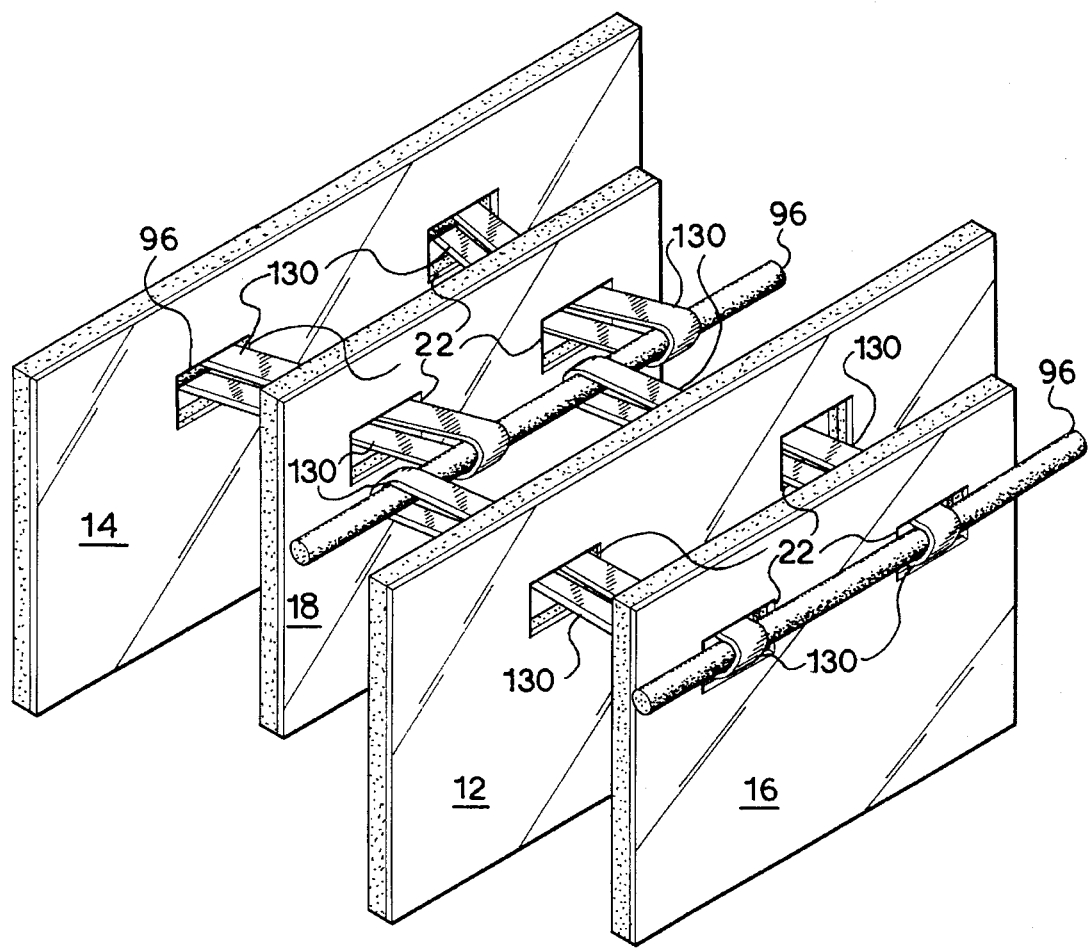
FIG. 6 is a perspective view of the present hunting blind in a disassembled state, showing the means for transporting the blind.

As noted above, however, hand transport of the present blind 10 is readily feasible, particularly in its disassembled state. One means providing for easy transport of the disassembled blind 10 is shown in FIG. 6, wherein the view ports 22 of each of the panels 12/14/16/18 are opened to provide passages therethrough, and the panels stacked together to form a first pair of panels 12/16 and a second pair of panels 14/18. The view ports 22 of each pair are aligned with one another, and a carriage loop 130 is passed through the aligned view port passages 22 of each pair of panels. A first and an opposite second retaining pole (which may be the same poles 96 as used for the top support members of FIGS. 1 and 3) are passed through the loops 130 to the outside of each pair of panels 12/16 and 14/18 to retain the loops 130 within the passages 22, and a third, central carriage pole (again, a top support member pole 96 may be used) is passed between the two pairs of panels and through the loops 130 extending therebetween. The central or third carriage pole 96 may then be lifted from each end, to lift the loops 130 and thereby lift the panel pairs 12/16 and 14/18 to either side of the central pole or member 96, by means of the loops 130 being captured in the view port passage 22 of the panels due to the two outer, first and second carriage poles or members 96. It will be seen that a rigid roof member may also be carried in a like manner, if that roof member is provided with appropriate carriage loop passages; the hatch openings 122 may be used, if they are advantageously positioned for such use. The edge connectors may be left in place on some of the panels for carriage thereof, and the flexible sheet top cover 20 of FIG. 1 may be rolled or folded for carriage, as desired.

In summary, the present portable, reflectively mirrored hunting blind 10 in its various embodiments will be seen to provide excellent camouflage for a hunter. Although it is primarily directed to the hunting of waterfowl, it will be seen that the present blind 10 is also easily adaptable and useful in other types of hunting, as the outwardly mirrored panels automatically take on the reflective appearance of their environment, whatever it may be. The various additional features provide even greater utility for the present blind, and it will be seen that not only hunters, but others interested in wildlife, such as bird watchers and animal photographers, will also appreciate the concealment provided by the present blind 10 in its various embodiments.

It is to be understood that the present invention is not limited to the sole embodiments described above, but encompasses any and all embodiments within the scope of the following claims.

I claim:

1. A portable hunting blind, comprising:

a front panel, an opposite rear panel, and a first and an opposite second side panel, with each said panel being of rigid, substantially inflexible construction and having a flat mirrored reflective and substantially optically correct outwardly facing surface adapted to reflect accurately the surrounding environment and thereby substantially conceal the appearance of said blind when assembled to define an interior, and further each having a first and an opposite second lateral edge, and;

camouflaged top cover means adapted to cover said interior at least substantially when said hunting blind is assembled and to blend substantially with the surrounding environment when viewed from above, said top cover means including a thin, flexible sheet of material having a camouflage pattern thereon, and a plurality of substantially parallel lateral poles extending across said interior of said blind and providing support for said sheet of material, whereby;

each said panel and said top cover means are transported to a desired hunting site, and said hunting blind is assembled and used to provide concealment for at least one hunter therein by means of said reflectively mirrored surface of each said panel and said camouflaged top cover means.

2. The hunting blind of claim 1, including:

a plurality of removable panel edge connectors, with each of said connectors having two parallel channels with openings forming a right angle therebetween, and adapted to form a rigid rectangular structure when said edge connectors are removably assembled to each said first and said second lateral edge of each said panel.

3. The hunting blind of claim 2, including:

at least two panel edge channel members, with each of said channel members having only a single channel therein and adapted to be removably installed along an adjacent said first and said second lateral edge of a first and an adjacent second said panel.

4. A portable hunting blind, comprising:

a front panel, an opposite rear panel, and a first and an opposite second side panel, with each said panel being formed of a rigid, substantially inflexible sheet of reinforced closed cell foam material and a sheet of flat, transparent reflectively mirrored plastic material bonded thereto to provide a substantially optically correct outwardly facing surface adapted to reflect accurately the surrounding environment and thereby substantially conceal the appearance of said blind when assembled to define an interior;

a camouflaged top cover comprised of a rigid sheet of closed cell foam material, said top cover including at least one opening therein adapted to allow at least the head and shoulders of a hunter to pass therethrough;

an openable lid for said top cover, said lid including an opening therein adapted to allow the head of a hunter to be inserted therethrough, and a hollow waterfowl decoy spaced thereabove to define an observation slot between decoy and said lid, and;

said blind including rapid opening means for said lid adapted to allow a hunter to release said rapid opening means to cause said lid to be removed rapidly from said top cover opening for hunting, whereby;

each said panel is transported to a desired hunting site, and said hunting blind is assembled and used to provide concealment for at least one hunter therein by means of said reflectively mirrored surface of each said panel.

5. The hunting blind of claim 4, wherein each said panel comprises in order:

a first, outer layer of clear, transparent plastic sheet having an outer surface and an opposite inwardly facing surface;

a second layer comprising an opaque mirrored coating disposed over said inwardly facing surface of said plastic sheet;

a third layer comprising an adhesive adapted to bond said plastic sheet with said mirrored coating to said reinforced sheet of foam material;

a fourth layer comprising an outwardly facing reinforcement sheet disposed over said sheet of foam material and bonded to said mirrored coating inwardly facing surface of said plastic sheet by means of said adhesive layer;

a fifth layer comprising a thick sheet of closed cell foam plastic material;

a sixth layer comprising an inwardly facing reinforcement sheet disposed over said sheet of foam material on an inwardly facing surface opposite said outwardly facing reinforcement sheet, and;

a seventh layer comprising an ultraviolet protective coating and disposed over said inwardly facing reinforcement sheet.

6. The hunting blind of claim 4, wherein:

at least one said panel has an upper portion having at least one selectively openable and closable view port formed therein, with said view port including a view port closure having a construction and mirrored outwardly facing surface substantially identical to said panel.

7. The hunting blind of claim 4, wherein:

at least one said panel has a lower portion having at least one selectively openable and closable swinging door formed therein, with said door having a construction and mirrored outwardly facing surface substantially identical to said panel and adapted for the passage of a hunting dog therethrough.

8. The hunting blind of claim 4, wherein:

at least one said panel has a plurality of small perforations therein adapted for the passage of sound therethrough, and a lower portion having a passage therethrough adapted for the passage of a wire cable therethrough.

9. The hunting blind of claim 4, wherein:

said reinforced, closed cell foam material of at least one said panel includes a retractable shelf formed therein, selectively extendable to provide a shelf within said interior of said hunting blind.

10. The hunting blind of claim 4, wherein:

said reinforced, closed cell foam material of at least one said panel includes a hollowed portion therein adapted for the storage of small articles therein.

11. The hunting blind of claim 4, wherein:

said reinforced, closed cell foam material of at least one said panel includes at least one peg hole formed therein, with at least one peg being provided for removable installation thereof in said peg hole to provide for the hanging of articles from said peg.

12. The hunting blind of claim 4, including:

at least one gun rack providing for the removable retention of at least one gun therein, with said gun rack being formed of a sheet of resilient material and being removably installable within said interior of said blind and being removably securable to said reinforced, closed cell foam material of at least one said panel.

13. A portable hunting blind, comprising:

a front panel, an opposite rear panel, and a first and an opposite second side panel, with each said panel being formed of a rigid, substantially inflexible opaque sheet of reinforced closed cell foam material and a sheet of flat, transparent one way reflectively mirrored plastic material bonded thereto;

said reflectively mirrored plastic material having a mirrored surface immediately adjacent said foam material and an opposite outwardly disposed transparent sheet to provide a substantially optically correct outwardly facing mirrored surface adapted to reflect accurately the surrounding environment and thereby substantially conceal the appearance of said blind when assembled to define an interior and further to protect said inwardly disposed mirrored surface from damage;

a camouflaged top cover comprised of a rigid sheet of closed cell foam material, said top cover means including at least one opening therein adapted to allow at least the head and shoulders of a hunter to pass therethrough;

an openable lid for said top cover, said lid including an opening therein adapted to allow the head of a hunter to be inserted therethrough, and a hollow waterfowl decoy spaced thereabove to define an observation slot between said decoy and said lid, and;

said blind including rapid opening means for said lid adapted to allow a hunter to release said rapid opening means to cause said lid to be removed rapidly from said top cover opening for hunting, whereby;

each said panel is transported to a desired hunting site, and said hunting blind is assembled and used to provide concealment for at least one hunter therein by means of said reflectively mirrored surface of each said panel.

14. The hunting blind of claim 13, including:

at least one thin, transparent sheet of material removably securable over said outwardly disposed transparent sheet of a corresponding at least one said panel, and adapted to reduce reflected glare from said reflectively mirrored surface of said corresponding at least one said panel.

15. The hunting blind of claim 13, wherein:

at least one said panel includes a bottom portion, with said bottom portion of said at least one said panel including anchor means for said blind secured to said reinforced closed cell foam material of said at least one said panel and extending inwardly therefrom to be disposed within said blind;

said anchor means comprising at least one sheet of thin, flexible material adapted for the placement of weight thereon and thereby being secured against an underlying surface and precluding movement of said at least one said panel to which said anchor means is secured, and thereby further precluding movement of said blind including said at least one said panel.

16. The hunting blind of claim 13, wherein:

said blind is adapted for disassembly, transport, and storage, with each said panel of said blind being separable from one another and adapted to form a stacked array of plural panels for storage and transport of said blind;

each said panel includes at least one passage therethrough, with each said at least one passage being substantially aligned with one another when said blind is disassembled and said panels are stacked together to provide a first pair and a second pair of said panels with a plurality of substantially aligned carriage passages therethrough;

said blind includes carriage means, comprising a plurality of carriage loops adapted for passage through said substantially aligned carriage passages of said panels, with said loops being retained through said carriage passages by a first and an opposite second retaining pole respectively retaining said loops through said first pair and said second pair of panels and disposed to opposite sides of said stacked array of panels, and a central carriage pole passed through said loops between each said pair of panels, with said carriage pole providing for the lifting and carriage of said panels by means of said loops retained through said carriage passages of said panels.

* * * * *